United States Patent

[11] 3,621,406

[72] Inventors Thomas O. Paine
Administrator of the National Aeronautics and Space Administration with respect to an invention of;
Carl E. Johns, Sylmar, Calif.

[21] Appl. No. 883,528
[22] Filed Dec. 9, 1969
[45] Patented Nov. 16, 1971

[54] CONTINUOUSLY VARIABLE VOLTAGE-CONTROLLED PHASE SHIFTER
8 Claims, 4 Drawing Figs.

[52] U.S. Cl. .......... 328/155, 307/262, 307/295, 328/24
[51] Int. Cl. .......... H03b 3/04
[50] Field of Search .......... 328/24, 104, 105, 154, 155; 307/262

[56] References Cited
UNITED STATES PATENTS

| | | | |
|---|---|---|---|
| 2,454,426 | 11/1948 | Beckwith | 328/155 |
| 2,557,085 | 6/1951 | Fisk et al. | 328/104 |
| 2,563,954 | 8/1951 | Palmer | 328/155 X |
| 3,131,363 | 4/1964 | Landee et al. | 328/155 X |

*Primary Examiner*—Roy Lake
*Assistant Examiner*—James B. Mullins
*Attorneys*—J. H. Warden, Paul F. McCaul and G. T. McCoy ABSTRACT: A continuously variable phase shifter including a phase splitter which provides four quadrature signals of an input signal, a summing resistor and a phase control diode matrix between the phase splitter and the summing resistor. The matrix includes a separate diode in the path of each of said four signals. The four diodes are connected to two terminals at which DC control voltages are applied to control the states of conduction of the four diodes. The diodes are controlled so that only one diode is fully forward biased when 0°, 90°, 180° or 270° phase shift is desired while two of the four diodes are partially forward biased when a phase shift between any two of the above four values is desired.

CARL E. JOHNS
*INVENTOR.*

BY [signature]

ATTORNEYS

CONTINUOUSLY VARIABLE VOLTAGE-CONTROLLED PHASE SHIFTER

ORIGIN OF THE INVENTION

The invention described herein was made in the performance of work under a NASA contract and is subject to the provisions of section 305 of the National Aeronautics and Space Act of 1958, public law 85-568 (72 Stat. 435; 42 USC 2457).

BACKGROUND OF THE INVENTION

1. Field of the Invention

The present invention generally relates to a signal phase shifter and, more particularly, to an apparatus for continuously shifting the phase of an input signal in response to DC control voltages.

2. Description of the Prior Art

Various types of phase shifters for producing a variable phase shift are well known. Most of them are quite bulky, employing resolvers which are mechanically rotated to produce the desired phase shift. There are some applications, such as in space exploration systems, in which space is of a premium. In such applications, very small shifters, adaptable to integrated circuit fabrication, are highly desirable. Also, in such applications it is often required that the phase shifter operate over a wide frequency range and that the desired phase shift be controllable by simple commands, from remotely located equipment. Prior art phase shifters do not satisfy one or more of such requirements.

OBJECTS AND SUMMARY OF THE INVENTION

It is a primary object of the present invention to provide a new simple phase shifter.

Another object of the invention is to provide a new phase shifter which is capable of being fabricated so that it occupies a minimum volume.

A further object of the invention is the provision of a very small phase shifter, operable over a wide frequency range.

Still a further object of the invention is to provide a very small phase shifter capable of continuous shifting of the phase of an input signal in response to remotely supplied DC control voltages.

These and other objects of the invention are achieved by providing a phase shifter in which a reference input signal of a frequency, variable over a wide range, e.g., 100 kHz. to 10 MHz., is split, such as by means of a phase splitter, into four reference signals. These signals are shifted relative to one another by 90°. Each of these four signals is supplied to a load summing resistor through a separate diode. The output of the summing resistor represents the phase shifter's output. Two interrelated DC control voltages are applied to the four diodes to control their resistances so that the phase of the signal across the summing resistor, with respect to the reference input signal, is a function of the two interrelated DC control voltages.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
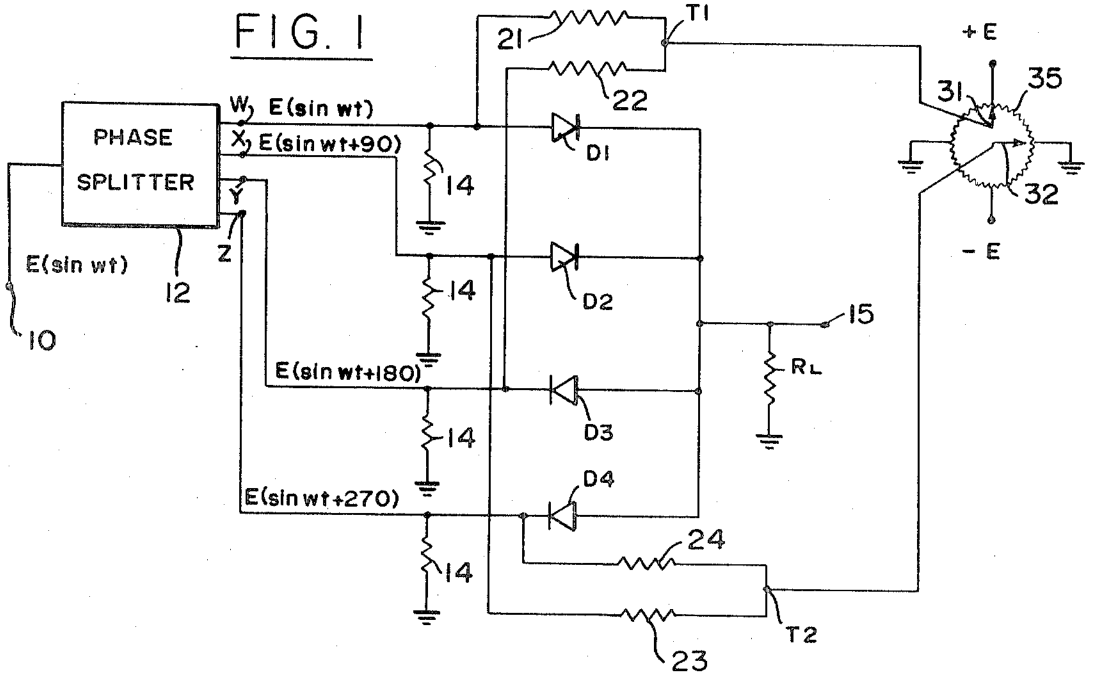
FIG. 1 is a combination block and schematic diagram of one embodiment of the invention.

Referring to FIG. 1, therein numeral 10 designates an input terminal at which a reference input signal is applied. For generality, the input signal is designated E(sin wt.) This input signal is supplied to a phase splitter 12 which provides four related reference signals at four output terminals W, X, Y and Z. The four signals are of the same frequency as the input signals, and are shifted by 90° relative to one another. For explanatory purposes, the four signals at W, X, Y and Z are assumed to be E(sin wt), E(sin wt + 90), E(sin wt + 180) and E(sin wt + 270), respectively. These signals may be thought of as quadrature signals.

Each of the terminals is connected to ground through a resistor 14, and to an output terminal 15 through a separate diode. The four diodes, which are designated D1–D4, form a phase control diode matrix. Shunted across the output terminal 15 and ground is a summing load resistor, $R_L$. It is the summed signal across $R_L$ which represents the phase shifter's output.

In accordance with the teachings of this invention, continuous phase shifting is achieved by controlling the resistances which the four diodes exhibit. This is accomplished by controlling their states of conduction, which is accomplished by controlling their biasing conditions. From FIG. 1, it should be appreciated that when only D1 is forward biased so that its resistance is practically zero and all other three diodes, D2–D4 are back biased, the signal across $R_L$ is only the signal at terminal W, i.e., E(sin wt) which is at 0° phase shift with respect to the input signal. On the other hand, when only D2 is forward biased, the output signal is E(sin wt++90), which is shifted by 90° with respect to the input signal. Likewise, 180° or 270° phase shift is realized when only D3 or D4, respectively, is the only forward-biased diode.

A phase shift between 0° and 90° achieved by controlling the relative forward biasing of D1 and D2, when the other two diodes, D3 and D4 are back biased, while phase shifting between 90° and 180° is achieved by controlling the relative forward biasing of D2 and D3 while D1 and D4 are back biased. Likewise, by controlling the relative forward biasing of D3 and D4 or D4 and D1, while in each case the other two diodes are back biased, phase shifts between 180° and 270° or between 270° and 360° are achieved.

The resultant signal across $R_L$ may be expressed as:

$$E_{R_L}=E\left[(\sin wt)\frac{R_L}{R_{D1}+R_L}+(\sin wt+90)\frac{R_L}{R_{D2}+R_L}+(\sin wt+180)\frac{R_L}{R_{D3}+R_L}+(\sin wt+270)\frac{R_L}{R_{D4}+R_L}\right]$$

where $R_{D1}$, $R_{D2}$, $R_{D3}$ and $R_{D4}$ represent the resistances of $D1$, $D2$, $D3$ and $D4$, respectively. The resistance of each diode is assumed to be infinite when the diode is back biased, equal to zero when the diode is fully forward biased, and varying between infinite to zero as the diode is switched from its back biased condition to a fully forward-biased state.

In accordance with the teachings of the present invention, diodes D1 and D2 have their cathodes connected to terminal 15 while their anodes are tied to their respective terminals W and X, while the anodes of D3 and D4 are tied to terminal 15 and their cathodes are tied to terminals Y and Z, respectively. The anode of D1 and the cathode of D3 are connected to a first DC voltage control terminal, T1 through resistors 21 and 22, respectively. Likewise, the anode of D2 and the cathode of D4 are connected to a second DC voltage control terminal, T2 through resistors 23 and 24, respectively. It is the DC voltages at T1 and T2 which control the states of conduction of the four diodes and thereby control the phase of the signal across $R_L$ with respect to the input signal.

For explanatory purposes, let it be assumed that D1 or D2 is fully forward biased when the potential at its anode is +E, while being back biased when the voltage is zero or below. And, it is further assumed that D3 or D4 is fully forward biased when the potential at its cathode is −E and that it is back biased when the potential is zero or above. Zero potential is assumed to be represented by ground.

In one embodiment of the invention, shown in FIG. 1, the DC potentials at T1 and T2 are provided from the two armatures 31 and 32 of a sine/cosine potentiometer 35, whose 0°, 90°, 180° and 270° points are connected to ground, +E, ground, and −E, respectively. When the potentiometer's shaft is at 90° rotation (as shown), +E DC volts are applied at T1, while T2 is at ground. As a result, only D1 is fully forward biased and the other diodes are back biased so that they are not conducting, i.e., current does not flow therethrough since their resistances are assumed to be infinite when they are back biased. Consequently, the output signal is E(sin wt), representing 0° phase shift.

Shaft rotation from 90° to 180° causes a decrease in the DC potential at T1 from +E to ground and an increase in the DC potential at T2 from ground to +E. Consequently, D1 is gradually back biased and D2 forward biased, while the two other diodes, D3 and D4, remain back biased. Thus, the resultant output signal is $$E_{R_L}=E\left[(\sin wt)\frac{R_L}{R_{D1}+R_L}+(\sin wt+90)\frac{R_L}{R_{D2}+R_L}\right]$$

Therefrom, it is seen that the degree of phase shift between 0° and 90° depends on $R_{D1}$ and $R_{D2}$, which depend on the degrees of the forward biasing of the two diodes $D1$ and $D2$ which in turn depend on the potentials at T1 and T2, as a function of the shaft position.

When the shaft is rotated to be at the 180° position, T1 is at ground and T2 is at +E. Thus, only D2 is forward biased, to result in a phase shift of 90°. As the shaft rotates from 180° to 270° the potential at T1 changes from ground to −E and that at T2 from +E to ground. As a result, D2 is gradually cut off and D3 conducts to provide an output across $R_L$ with a phase shift between 90° and 180°. From the foregoing it should be apparent that as the shaft rotates from 270° to 360°, the phase shift varies from 180° to 270°, while a phase shift between 270° and 360° is achieved as the shaft rotates between 0° and 90°.

Figure 2:
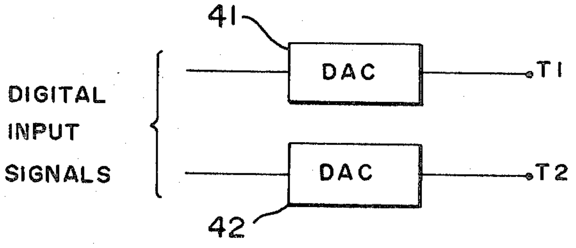
FIG. 2 is a simple block diagram of means for providing the two DC control voltages.

In the particular embodiment, the potentials at T1 and T2 are controlled as a function of the potentials of the armatures 31 and 32 of the potentiometer 35. However, the invention is not intended to be limited thereto. Any means which can control the potentials at the voltage control terminals T1 and T2, to produce a desired phase shift, may be employed. For example, as shown in FIG. 2, the potentials at T1 and T2 may be controlled by DC potentials which represent the outputs of digital to analog converters (DACs) 41 and 42, respectively, which are assumed to be supplied with digital signals, representing the desired phase shift. Any other means may be employed to apply two related DC potentials at T1 and T2 to cause either one diode to be fully forward biased or to control the partial forward biasing of two diodes while all the other diodes are back biased or cut off, in order to provide the desired degree of phase shift.

Figure 3:
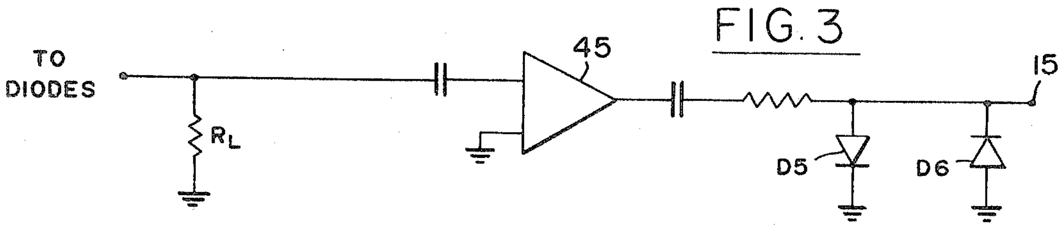
FIG. 3 is a diagram of an amplifier for amplifying the signal across a summing resistor.
Figure 4:
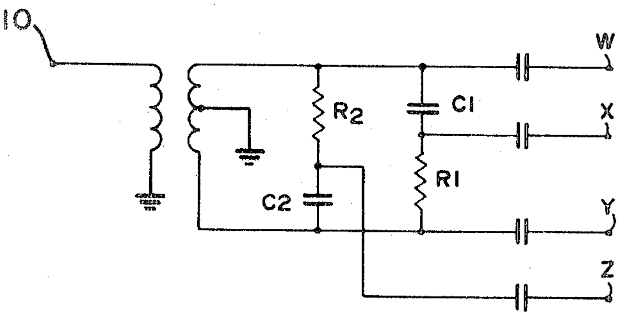
FIG. 4 is a schematic diagram of one embodiment of the phase splitter shown in FIG. 1.

In practice, the amplitude of the output signal across $R_L$ may be quite small. Thus, it may be desirable to amplify the signal to a suitable level. In the embodiment in which the potentiometer 35 is incorporated, it may be desirable to include amplitude limiters to reduce the reference signal amplitude variations due to potentiometer rotation. Such an arrangement is shown in FIG. 3, wherein the amplifier is designated by numeral 45 and the amplitude limiters consist of diodes D5 and D6. FIG. 4, to which reference is made, represents one embodiment of a phase splitter. It should be pointed out that to change the operating center frequency of the phase shifter it is necessary to change the values of C1 and C2 to assure 90° phase lead and lag, so that four signals at terminals W, X, Y and Z, are shifted relative to one another by exactly 90°.

As seen from FIG. 1, the novel phase shift control diode matrix comprises only diodes D1–D4 and several resistors, all of which can be fabricated as an integrated circuit to occupy a minimum volume. When incorporating amplifier 45, the amplifier may also form part of the integrated circuit. Since the phase shift is controllable by controlling the DC potentials at T1 and T2, any remote control techniques may be used to control the DC potentials at these two terminals. Also, since the phase shift is controlled by controlling the resistances of diodes, satisfactory performance over a very wide frequency range is achieved.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A phase shifter comprising:

phase-splitting means responsive to an input signal for providing four signals including first, second, third and fourth signals, each of the same frequency as the input signal, with said first, second, third and fourth signals having phase differences with respect to said input signal of 0°, 90°, 180° and 270°, respectively;

signal summing means; and phase control diode means including four diodes coupled to said signal-summing means and to said phase-splitting means, with each diode in the path of a different one of said four signals, and;

bias control means connected to said four diodes for controlling the states of conduction thereof, thereby to control the phase shift of the signal summed by said signal-summing means which is a function of said four signals and the states of conduction of said four diodes, with said bias control means being adapted to vary the states of conduction of said four diodes so as to continually vary the phase shift over the entire range from 0° to 360° with three of said four diodes being in a back biased state when the phase shift is $n\times90°$ where $n$ is an integer not greater than four and two of said diodes are in a back biased state when the phase shift is not an integer multiple of 90°.

2. The arrangement as recited in claim 1 wherein said bias control means includes a pair of control terminals, coupled to said four diodes and means for applying two related direct-current control voltages at said control terminals to control the states of conduction of said four diodes and thereby control the phase of the signal, summed up by said summing means, with respect to said input signal.

3. The arrangement as recited in claim 2 wherein first and second of said four diodes have their anodes coupled to said phase-splitting means and their cathodes to said signal-summing means and third and fourth diodes of said four diodes have their cathodes coupled to said phase-splitting means and their anodes to said signal-summing means.

4. The arrangement as recited in claim 3 wherein one of said terminals is connected to the anode and cathode of said first and third diodes, respectively, and the other control terminals is connected to the anode and cathode of said second and fourth diodes respectively.

5. In a continuously variable phase shifter for shifting the phase of an input signal between 0° and 360°, said phase shifter including a phase splitter which provides four signals consisting of first, second, third and fourth signals which are related to an input signal by phase differences of 0°, 90°, 180° and 270°, respectively, and a signal summer which sums various ones of said four signals to provide an output signal which has the desired phase difference with respect to said input signal, the improvement comprising:

phase control diode means coupled between said phase splitter and said signal summer, said phase control diode means including four diodes, each in the path of a different one of said four signals, and control means including means for applying two related potentials to said diodes to control the states of conduction of said four diodes with at least two of said four diodes being back biased.

6. The arrangement as recited in claim 5 wherein said means applying apply said two related potentials to said diodes so that only one of said diodes is fully forward biased and the other three diodes are back biased when a phase shift of $n\times 90°$ is desired, where $n$ equals 0, 1, 2 or 3, and wherein two diodes in the paths of two of said four signals having a phase difference of only 90° are partially forward biased and the other two are back biased when $n$ is other than an integer but less than 4.

7. The arrangement as recited in claim 5 wherein first and second diodes of said four diodes are in the paths of said first and second signals respectively, with the cathodes of said first and second diodes being connected to said signal summer, and wherein third and fourth diodes of said four diodes are in the paths of said third and fourth signals, respectively, with the anodes of said third and fourth diodes being connected to said signal summer, and said control terminal means being separately connected to the anodes of said first and second diodes and to the cathodes of said third and fourth diodes.

8. The arrangement as recited in claim 7 wherein said control means comprises first and second terminals, and means connecting said first terminal to the anode and cathode of said first and third diodes, respectively, and means connecting said second terminal to the anode and cathode of said second and fourth diodes, respectively.

* * * * *

PO-1050
(5/69)

UNITED STATES PATENT OFFICE
CERTIFICATE OF CORRECTION

Patent No. 3,621,406 Dated November 16, 1971

Inventor(s) Carl E. Johns

It is certified that error appears in the above-identified patent and that said Letters Patent are hereby corrected as shown below:

On the front page format:

Item [21] "Appl. No. 883,528" should read

-- Appl. No. 883,523 -- .

Signed and sealed this 21st day of November 1972.

(SEAL)
Attest:

EDWARD M.FLETCHER,JR.
Attesting Officer

ROBERT GOTTSCHALK
Commissioner of Patents